United States Patent
Wu et al.

(10) Patent No.: US 11,829,317 B2
(45) Date of Patent: Nov. 28, 2023

(54) CABLE, CONTROLLER, AND CONTROL METHOD

(71) Applicant: REALTEK SEMICONDUCTOR CORPORATION, Hsinchu (TW)

(72) Inventors: Ming-Chang Wu, Changhua County (TW); Kai Liu, Suzhou (CN); Yao Feng, Suzhou (CN); Neng-Hsien Lin, Kaohsiung (TW); Chen Shen, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 66 days.

(21) Appl. No.: 17/141,272

(22) Filed: Jan. 5, 2021

(65) Prior Publication Data
US 2021/0209054 A1  Jul. 8, 2021

(30) Foreign Application Priority Data
Jan. 7, 2020 (CN) .......................... 202010013248.7

(51) Int. Cl.
G06F 13/42 (2006.01)
G06F 13/40 (2006.01)

(52) U.S. Cl.
CPC ...... *G06F 13/4282* (2013.01); *G06F 13/4068* (2013.01); *G06F 2213/0042* (2013.01)

(58) Field of Classification Search
CPC .................................................. G06F 15/7896
See application file for complete search history.

(56) References Cited

U.S. PATENT DOCUMENTS

| | | | |
|---|---|---|---|
| 6,532,259 B1* | 3/2003 | Bush | G11B 20/10046 375/232 |
| 6,775,733 B2* | 8/2004 | Chang | G06F 13/4004 710/313 |
| 7,630,466 B2* | 12/2009 | Momtaz | H03L 7/0818 375/232 |
| 9,715,472 B2* | 7/2017 | Chang | H01R 13/6658 |
| 10,866,920 B2* | 12/2020 | Lin | G06F 13/4004 |
| 2010/0177644 A1* | 7/2010 | Kucharczyk | H04L 41/0681 370/250 |

FOREIGN PATENT DOCUMENTS

CN   110275855 A   9/2019

OTHER PUBLICATIONS

OA letter of the counterpart I W application (appl. No. 109104262) dated Jan. 29, 2021. Summary of the OA letter: 1.Claims 1, and 6-10 are rejected as allegedly being unpatentable in view of cited reference 1 (CN110275855A, also published as US 10,866,920 B2). 2.Claims 2-5 are allowable.

* cited by examiner

*Primary Examiner* — Henry Tsai
*Assistant Examiner* — Juanito C Borromeo
(74) *Attorney, Agent, or Firm* — WPAT, P.C

(57) ABSTRACT

A cable includes a first plug, a second plug, and a controller. The first plug is configured to be connected with a host. The second plug is configured to be connected with a device. The controller is coupled between the first plug and the second plug, and is configured to monitor a connection message transferred between the host and the device, and to determine, according to the connection message, a transfer mode that the host and the device is to enter, and to set a plurality of electrical parameters to be a corresponding one set in a plurality of sets of predetermined parameters.

15 Claims, 3 Drawing Sheets

CABLE, CONTROLLER, AND CONTROL METHOD

BACKGROUND OF THE INVENTION

1. Field of the Invention

The present disclosure relates to a cable, especially to an active cable that employs universal serial bus (USB) type-C, a controller, and a control method thereof.

2. Description of Related Art

A universal serial bus (USB) is widely employed in various electronic devices, enabling the transfer of data between these devices. In the USB type-C technology, the USB interface is able to support multiple transfer modes for transmitting high-speed data, high power or current, and/or video/audio streaming data. In current applications, in order to support more transfer modes, additional signal processor circuits are required to be employed in electronic devices, resulting in higher hardware cost. If the additional signal processor circuits are not employed in the electronic devices in advance, these electronic devices would not be able to support other transfer modes, resulting in electronic devices having lower versatility.

SUMMARY OF THE INVENTION

In some embodiments, a cable includes a first plug, a second plug, and a controller. The first plug is configured to be connected with a host. The second plug is configured to be connected with a device. The controller is coupled between the first plug and the second plug, and is configured to monitor a connection message transferred between the host and the device, and configured to determine, according to the connection message, a transfer mode that the host and the device is to enter, and to set a plurality of electrical parameters to be a corresponding one set in a plurality of sets of predetermined parameters.

In some embodiments, a controller includes a controller circuit and a repeater circuit. The controller circuit is configured to monitor a connection message transferred between a host and a device, and configured to determine, according to the connection message, a transfer mode that the host and the device is to enter, and to generate a first control signal, in which the host is connected to the device via a cable. The repeater circuit is configured to set a plurality of electrical parameters to be a corresponding one set in a plurality of sets of predetermined parameters according to the first control signal, in order to adjust a signal transferred via the cable.

In some embodiments, a control method includes the following operations: monitoring a connection message transferred between a host and a device, in which the host is connected to the device via a cable; determining, according to the connection message, a transfer mode that the host and the device is to enter, to generate a first control signal; and setting a plurality of electrical parameters to be a corresponding set in a plurality of sets of predetermined parameters, in order to adjust a signal transferred via the cable.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

In this document, the term "circuitry" may indicate a system formed with one or more circuits. The term "circuit" may indicate an object, which is formed with one or more transistors and/or one or more active/passive elements based on a specific arrangement, for processing signals. As used herein, the term "and/or" includes any and all combinations of one or more of the associated listed items.

Figure 1:
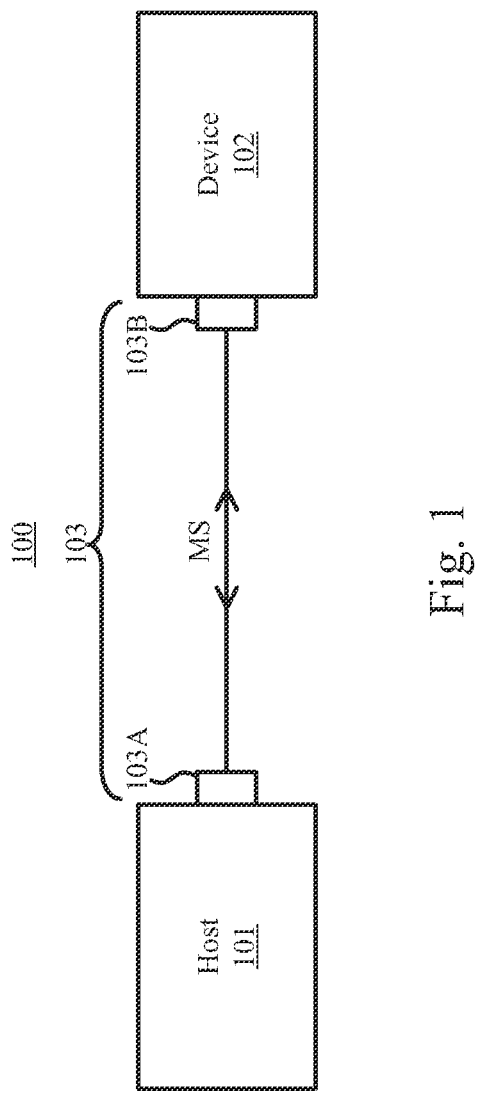
FIG. 1 is a schematic diagram of a data transmission system according to some embodiments of the present disclosure.

FIG. 1 is a schematic diagram of a data transmission system 100 according to some embodiments of the present disclosure. The data transmission system 100 includes a host 101, a device 102, and a cable 103. The cable 103 includes a plug 103A and a plug 103B. The plug 103A is connected to the host 101, and the plug 103B is connected to the device 102. The host 101 and the device 102 transfer electronic signal(s) (which may be, for example, a connection message, normal data, charging current, and so on) to each other via the cable 103.

In some embodiments, a type of the plug 103A and the plug 103B is a universal serial bus (USB) connector. In some embodiments, the type of the plug 103A and the plug 103B is a USB type-C connector. In this case, the electronic signal(s) may include a connection message MS defined in a power delivery protocol. In some embodiments, the connection message MS includes a start-of-packet (SOP) message transferred between the host 101 and the device 102, in which the SOP message is for indicating a transmission mode to be entered or applied by the host 101 and the device 102.

In some embodiments, the host 101 may be a computer, a notebook, a smart phone, a tablet, or the like, and the device 102 may be a USB flash drive, a monitor, a projector, audio equipment, or the like. The above types of the host 101 and those of the device 102 are given for illustrative purposes, and the present disclosure is not limited thereto.

In some embodiments, the cable 103 is an active cable, which is able to monitor the connection message MS to determine a transfer mode that host 101 and the device 102 is to enter (which is referred to as "expected transfer mode"

hereinafter). In response to this expected transfer mode, the cable 103 adjusts or sets its internal circuit parameter(s), such that electronic signal(s) transferred via the cable 103 is able to meet requirements of the expected transfer mode. Related operations are described in the following paragraph with reference to FIG. 2.

Figure 2:
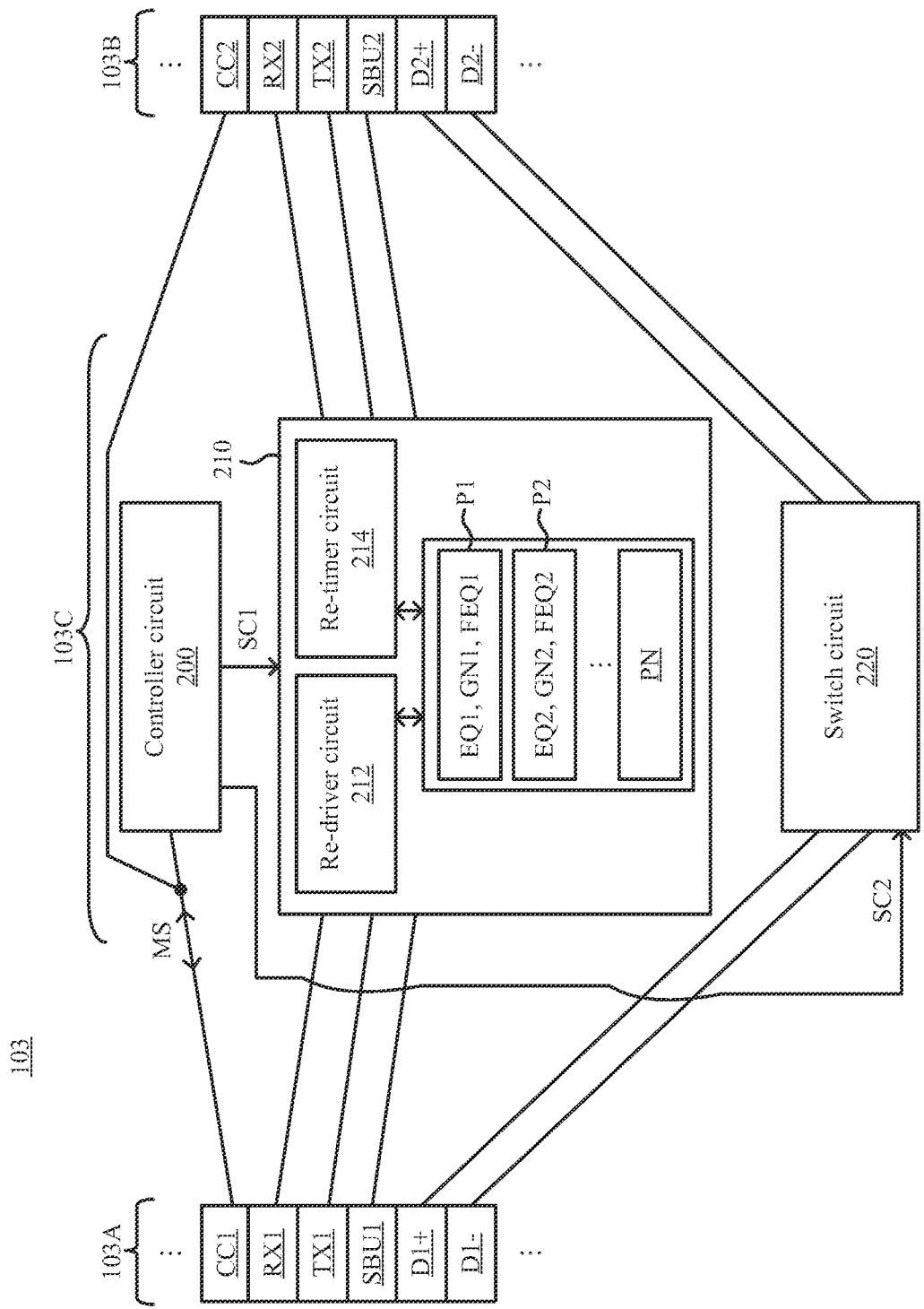
FIG. 2 is a schematic diagram of the cable in FIG. 1 according to some embodiments of the present disclosure.

Reference is made to FIG. 2. FIG. 2 is a schematic diagram of the cable 103 in FIG. 1 according to some embodiments of the present disclosure. For ease of understanding, like elements in FIGS. 1-2 are designated with the same reference number.

As shown in FIG. 2, the cable 103 includes the plug 103A, the plug 103B, and a controller 103C. The plug 103A and the plug 103B are respectively arranged at two terminals of the cable 103. In some embodiments, the controller 103C may be set at a side of the plug 103A or a side of the plug 103B, but the present disclosure is not limited thereto. The controller 103C is configured to monitor the connection message MS, in order to configure multiple electrical parameters of the cable 103.

If each of the plug 103A and the plug 103B is a USB t e-C connector, the plug 103A includes a pin TX1, a pin RX1, a pin D1+, a pin D1−, a pin CC1, and a pin SBU1, and the plug 103B includes a pin TX2, a pin RX2, a pin D2+, a pin D2−, a pin CC2, and a pin SBU2. The pin TX1, the pin RX1, the pin TX2, and the pin RX2 support a transfer rate of USB 3.0 or a related successor standard, and are configured to transmit/receive normal data and/or to transmit/receive video data under certain modes. The pin D1+, the pin D1−, the pin D2+, and the pin D2− are configured to be compatible with a USB 2.0 interface. The pin CC1 and the pin CC2 are configuration channel pins defined in the USB type-C specification, which are configured to transfer the connection message MS and to set the expected transfer mode. The host 101 may transfer the connection message MS to the device 102 via the pin CC1 and the pin CC2, in order to determine the expected transfer mode. In some embodiments, the connection message MS includes information including a specific signal pattern that corresponds to the expected transfer mode, a specific voltage value of each of the pin CC1 and the pin CC2, etc. The pin SBU1 and the pin SBU2 are side-band signaling pins defined in the USB type-C specification, which are configured to transfer signals under a specific transfer mode (e.g., an alternate mode discussed below).

The controller 103C includes a controller circuit 200, a repeater circuit 210, and a switch circuit 220. The controller circuit 200 is coupled to the pin CC1 and the pin CC2, in order to monitor the connection message MS. The controller circuit 200 determines the expected transfer mode according to the connection message MS. For example, when the controller circuit 200 detects that the connection message MS includes a first specific signal pattern (which, for example, may be (but not limited to) 1111) and/or information indicating that a voltage of the pin CC1 (or the pin CC2) is a first voltage (which, for example, may be (but not limited to) a high voltage), the controller circuit 200 determines that the expected transfer mode is a USB mode for transferring normal data. Alternatively, when the controller circuit 200 detects that the connection message MS includes a second specific signal pattern (which, for example, may be (but not limited to) 0000) and/or information indicating that the voltage on the pin CC1 (or the pin CC2) is a second voltage (which, for example, may be (but not limited to) a low voltage), the controller circuit 200 determines that the expected transfer mode is the alternate mode. According to the specification of the USB type-C, in the alternate mode, the cable 103 supports protocol(s) including Displayport (DP), high-definition multimedia interface (HDMI), mobile high-definition link (MHL), Thunderbolt, peripheral component interconnect express (PCI-E), etc., in order to transfer video/audio streaming data. The controller circuit 200 outputs a control signal SC1 and a control signal SC2 in response to the connection message MS, in order to adjust a circuit configuration of at least one of the repeater circuit 210 and/or the switch circuit 220, in order to make data signals transferred via the cable 103 meet requirements of the expected transfer mode.

In some embodiments, the controller circuit 200 may be implemented with a physical layer circuit and a protocol layer circuit. The physical layer circuit may be implemented with a transceiver circuit and/or a voltage detector circuit, in order to receive the connection message MS, and the protocol layer circuit may be implemented with one or more digital circuits, in order to interpret the connection message MS based on a predetermined protocol (e.g., the aforementioned PD protocol). The above implementations of the controller circuit 200 are given for illustrative purposes, and the present disclosure is not limited thereto.

The repeater circuit 210 is coupled to the pin TX1, the pin TX2, the pin RX1, the pin RX2, the pin SBU1, and the pin SBU2. The repeater circuit 210 is configured to set the multiple electronic parameters to be a corresponding one of sets of predetermined parameters P1-PN according to the control signal SC1, in order to adjust a signal quality of the data signal (not shown) transferred via the cable 103. For example, the repeater circuit 210 may include a re-driver circuit 212 and/or a re-timer circuit 214. The re-driver circuit 212 may set amplitude of the data signal transferred via the cable 103. The re-timer circuit 214 is configured to generate a reconstructed clock signal (not shown), in order to recover the data signal transferred via the cable 103. In some embodiments, the re-driver circuit 212 may cooperate with the re-timer circuit 214 to provide signal equalization, in order to compensate channel loss and to meet requirements of the expected transfer rate.

In this example, the multiple electrical parameters may include the equalization coefficient EQ, the gain GN, the frequency range FEQ, etc., and these parameters are configured to adjust a circuit configuration of the re-driver circuit 212 and/or that of the re-timer circuit 214, in order to adjust the signal equalization. For example, the equalization coefficient EQ and the gain GN are for adjusting a signal band to be processed by the re-driver circuit 212 and the amplification gain of the re-driver circuit 212, and the frequency range FEQ is for adjusting a frequency of a reconstructed clock signal generated by the re-timer circuit 214. The relationships between the electrical parameters and the circuit configurations are given for illustrative purposes, and the present disclosure is not limited thereto.

The sets of predetermined parameters P1-PN are different from each other and correspond to different transfer modes. Each of the sets of predetermined parameters P1-PN includes values of these electrical parameters in one specific transfer mode. For example, the sets of predetermined parameters P1-PN includes a first set of predetermined parameters P1 and a second set of predetermined parameters P2. A value EQ1, a value GN1 and a value FEQ1 in the first set of predetermined parameters P1 are values of the equalization coefficient EQ, the gain GN, and the frequency range FEQ in the USB mode, respectively. A value EQ2, a value GN2 and a value FEQ2 in the second set of predetermined parameters P2 are values of the equalization coefficient EQ, the gain GN, and the frequency range FEQ in the DP mode, respectively. If the controller circuit 200 determines that the expected transfer mode is the USB mode according to the connection message MS, the controller circuit 200 outputs the control signal SC1 having a first logic value to the repeater circuit 210. In response to this the control signal SC1, the repeater circuit 210 sets the equalization coefficient EQ, the gain GN, and the frequency range FEQ to be the value EQ1, the value GN1, and the value FEQ1, respectively.

Alternatively, if the controller circuit 200 determines that the expected transfer mode is the DP mode according to the connection message MS, the controller circuit 200 outputs the control signal SC1 having a second logic value to the repeater circuit 210. In response to the control signal SC1, the repeater circuit 210 sets the equalization coefficient EQ, the gain GN, and the frequency range FEQ to be the value EQ2, the value GN2, and the value FEQ2, respectively. In some embodiments, when operating in the USB mode, the re-timer circuit 214 may be disabled; when operating in the DP mode, the re-timer circuit 214 may be enabled to remove jitters of the data signals.

In some embodiments, if the controller circuit 200 determines that the host 101 and the device 102 are going to exit the DP mode, or the connection between both ends are interrupted or reset according to the connection message MS, the controller circuit 200 outputs the control signal SC1 having the first logic value to the repeater circuit 210, in order to set the multiple electrical parameters of the repeater circuit 210 to be the first set of predetermined parameters P1. The above examples described with the DP mode and the USB mode are given for illustrative purposes, and embodiments of the present disclosure are not limited to these two modes.

With the above configuration, the controller 103C is able to determine the transfer mode to be entered by the host 101 and the device 102 according to the connection message MS, and to set the electrical parameters accordingly, such that a signal quality of the data signal transferred via the cable 103 in this transfer mode can be improved.

In some embodiments, the controller 103C may have a register circuit (not shown) configured to store the sets of predetermined parameters P1-PN. In some embodiments, the register circuit and the repeater circuit 210 may be integrated as a single circuit, but the present disclosure is not limited thereto. In some embodiments, the repeater circuit 210 may only include the re-driver circuit 212, or may only include the re-timer circuit 214.

The switch circuit 220 is coupled to the pin D1+, the pin D1−, the pin D2+, and the pin D2−. The switch circuit 220 selectively cuts off a connection among the pin D1+, the pin D1−, the pin D2+, and the pin D2− according to the control signal SC2. For example, when the controller circuit 200 determines that the expected transfer mode is USB 2.0 mode according to the connection message MS, the controller circuit 200 output the control signal SC2 having the first logic value to the switch circuit 220, in order to keep the connection among the pin D1+, the pin D1−, the pin D2+, the pin D2− being connected. Alternatively, when the controller circuit 200 determines that the expected transfer mode is the alternate mode (e.g., DP mode or other mode(s)) according to the connection message MS, the controller circuit 200 outputs the control signal SC2 having the second logic value to the switch circuit 220, in order to cut off the connection among the pin D1+, the pin D1−, the pin D2+, and the pin D2−.

In some embodiments, the switch circuit 220 may include one or more switching circuits configured to selectively cut off the connection among the pin D1+, the pin D1−, the pin D2+, and the pin D2− according to the control signal SC2. The above implementations of the switch circuit 220 are given for illustrative purposes, and the present disclosure is not limited thereto.

In some related approaches, in order to support different transfer modes, an additional signal processor circuit and/or a driver are required to be employed in electronic devices in each of the host 101 and the device 102, in order to adjust signal processing configurations during a connection progress. As a result, hardware cost will be significantly increased. Moreover, if these additional circuits are not employed in the existing electronic devices in advance, these electronic devices cannot adapt to other transfer mode. In some embodiments of the present disclosure, the cable 103 is configured to set the electrical parameters according to the connection message MS, in order to adapt to different transfer modes. Compared with the above approaches, the hardware cost is reduced, and the existing electronic devices are able to support more transfer modes through the cable 103.

Figure 3:
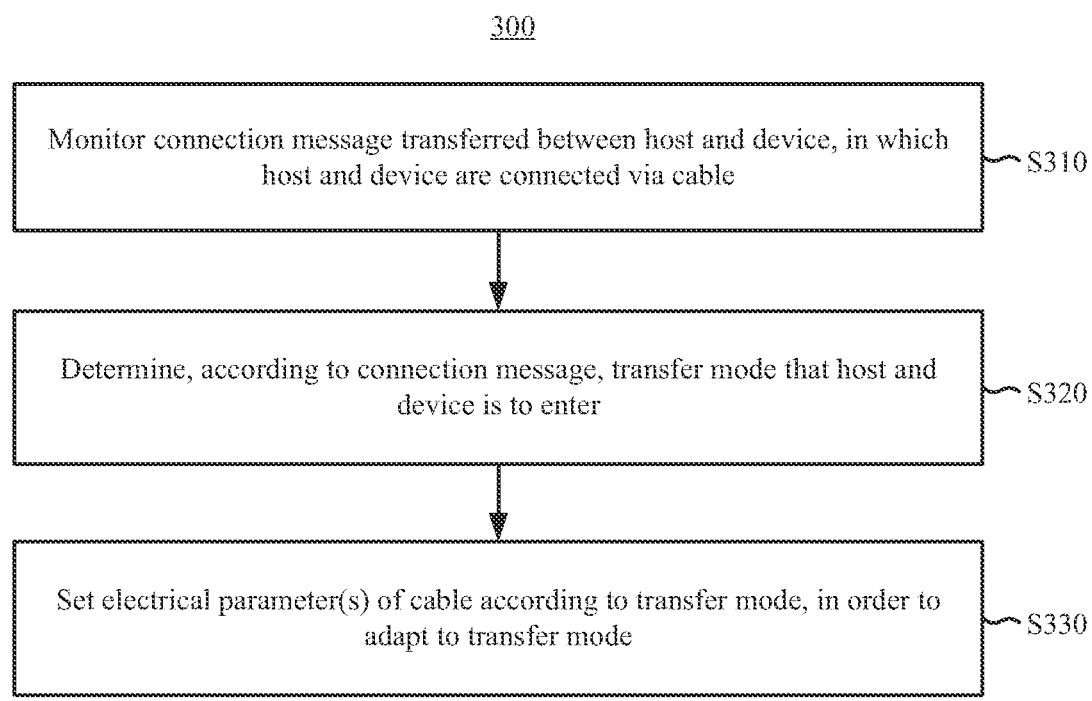
FIG. 3 is a flow chart of a control method according to some embodiments of the present disclosure.

Reference is made to FIG. 3. FIG. 3 is a flow chart of a control method 300 according to some embodiments of the present disclosure. In some embodiments, the control method 300 may be performed by the cable 103 in FIG. 1 or FIG. 2, but the present disclosure is not limited thereto.

In operation S310, a connection message transferred between the host and the device is monitored, in which the host and the device are connected with each other via the cable.

In operation S320, the transfer mode that the host and the device is to enter is determined according to the connection message.

In operation S330, the electrical parameters of the cable are set according to the transfer mode, in order to adapt to the transfer mode.

Operations S310, S320, and S330 can be understood with reference to embodiments of FIG. 1 or FIG. 2, and thus the repetitious descriptions are not further given. The above description of the control method 300 includes exemplary operations, but the operations of the control method 300 are not necessarily performed in the order described above. The order of the operations of the control method 300 can be changed, or the operations can be executed simultaneously or partially simultaneously as appropriate, in accordance with the spirit and scope of various embodiments of the present disclosure.

As described above, the cable, the controller, the control method provided in some embodiments of the present disclosure are able to monitor the transfer mode of the devices via the cable, in order to set internal parameters accordingly, such that a higher signal quality at different transfer modes can be achieved.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A cable, comprising:
a first plug configured to be connected with a host;
a second plug configured to be connected with a device; and
a controller coupled between the first plug and the second plug, configured to monitor a connection message transferred between the host and the device, and configured to determine according to the connection message a transfer mode that the host and the device is to enter and to set according to the transfer mode a plurality of electrical parameters to be a corresponding one set in a plurality of sets of predetermined parameters,
wherein the plurality of electrical parameters are set for adjusting a signal quality of a signal transferred via the first plug and the second plug, the connection message is a message defined in a power delivery protocol, and the controller is configured to determine whether the transfer mode is one of a universal serial bus (USB) mode and an alternate mode defined in a USB type-C specification according to the connection message.

2. The cable of claim 1, wherein the controller comprises:
a controller circuit configured to monitor the connection message and to generate a first control signal and a second control signal according to the connection message;
a repeater circuit configured to set the plurality of electrical parameters to be the corresponding one set in the plurality of sets of predetermined parameters according to the first control signal; and
a switch circuit configured to selectively cut off a connection between a first pin of the first plug and a second pin of the second plug according to the second control signal.

3. The cable of claim 2, wherein the plurality of electrical parameters comprise an equalization coefficient and a gain, and the repeater circuit comprises:
a re-driver circuit configured to set a circuit configuration of the re-driver circuit according to the equalization coefficient and the gain.

4. The cable of claim 2, wherein the plurality of electrical parameters comprise a frequency range, and the repeater circuit comprises:
a re-timer circuit configured to set a circuit configuration of the re-timer circuit according to the frequency range.

5. The cable of claim 2, wherein when the transfer mode is the USB mode, the repeater circuit is configured to set the plurality of electrical parameters to be a first set of predetermined parameters in the plurality of sets of predetermined parameters, and when the transfer mode is the alternate mode, the repeater circuit is configured to set the plurality of electrical parameters to be a second set of predetermined parameters in the plurality of sets of predetermined parameters, and the first set of predetermined parameters is different from the second set of predetermined parameters.

6. The cable of claim 2, wherein each of the first plug and the second plug is a USB type-C connector, and the first pin and the second pin are pins compatible with a USB 2.0 interface.

7. The cable of claim 1, wherein each of the first plug and the second plug is a USB type-C connector, and the controller is coupled to a first channel configuration pin of the first plug and a second channel configuration pin of the second plug, in order to monitor the connection message.

8. A controller, comprising:
a controller circuit configured to monitor a connection message transferred between a host and a device, and configured to determine according to the connection message a transfer mode that the host and the device is to enter, in order to generate a first control signal and a second control signal, wherein the host is connected to the device via a cable, the connection message is a message defined in a power delivery protocol, and the controller circuit is configured to determine whether the transfer mode is one of a universal serial bus (USB) mode and an alternate mode defined in a USB type-C specification according to the connection message;
a repeater circuit configured to set a plurality of electrical parameters to be a corresponding one set in a plurality of sets of predetermined parameters according to the first control signal, in order to adjust a signal transferred via the cable; and
a switch circuit configured to selectively cut off a connection between a first pin in a first plug of the cable and a second pin in a second plug of the cable according to the second control signal.

9. The controller of claim 8, wherein the plurality of electrical parameters comprise an equalization coefficient and a gain, and the repeater circuit comprises:
a re-driver circuit configured to set a circuit configuration of the re-driver circuit according to the equalization coefficient and the gain.

10. The controller of claim 8, wherein the plurality of electrical parameters comprise a frequency range, and the repeater circuit comprises:
a re-timer circuit configured to set a circuit configuration of the re-timer circuit according to the frequency range.

11. The controller of claim 8, wherein when the transfer mode is the USB mode, the repeater circuit is configured to set the plurality of electrical parameters to be a first set of predetermined parameters in the plurality of sets of predetermined parameters, and when the transfer mode is the alternate mode, the repeater circuit is configured to set the plurality of electrical parameters to be a second set of predetermined parameters in the plurality of sets of predetermined parameters, and the first set of predetermined parameters is different from the second set of predetermined parameters.

12. The controller of claim 8, wherein each of the first plug and the second plug is a USB type-C connector, and the controller circuit is coupled to a first channel configuration pin of the first plug and a second channel configuration pin of the second plug, in order to monitor the connection message.

13. A control method, comprising:
monitoring a connection message transferred between a host and a device, wherein the host is connected to the device via a cable, wherein the connection message is a message defined in a power delivery protocol;

determining whether a transfer mode that the host and the device is to enter is one of a universal serial bus (USB) mode and an alternate mode defined in a USB type-C specification according to the connection message, in order to generate a first control signal; and setting a plurality of electrical parameters to be a corresponding set in a plurality of sets of predetermined parameters, in order to adjust a signal transferred via the cable, wherein a first plug of the cable is connected to the host, a second plug of the cable is connected to the device, each of the first plug and the second plug is a USB type-C connector, and monitoring the connection message transferred between the host and the device comprises:

coupling a controller circuit to a first channel configuration pin of the first plug and to a second channel configuration pin of the second plug, in order to monitor the connection message.

14. The control method of claim 13, wherein the plurality of electrical parameters comprise an equalization coefficient and a gain, and setting the plurality of electrical parameters to be the corresponding set comprises:

setting a circuit configuration of a re-driver circuit of the cable according to the equalization coefficient and the gain.

15. The control method of claim 13, wherein the plurality of electrical parameters comprise a frequency range, and setting the plurality of electrical parameters to be the corresponding set comprises:

setting a circuit configuration of a re-timer circuit of the cable according to the frequency range.

\* \* \* \* \*